United States Patent [19]

Koma

[11] Patent Number: 4,957,064
[45] Date of Patent: Sep. 18, 1990

[54] OFFSHORE FISH CAGE FOR FARMING FISH

[75] Inventor: Norihiko Koma, Tokyo, Japan

[73] Assignee: Nippon Kokan Kabushiki Kaisha, Tokyo, Japan

[21] Appl. No.: 167,316

[22] Filed: Mar. 11, 1988

[30] Foreign Application Priority Data

Mar. 13, 1987 [JP] Japan .................... 62-56715

[51] Int. Cl.$^5$ ............................. A01K 61/00
[52] U.S. Cl. ...................................... 119/3
[58] Field of Search ............. 119/2, 3, 4; 43/102, 43/103

[56] References Cited

U.S. PATENT DOCUMENTS

| | | | |
|---|---|---|---|
| 4,003,338 | 1/1977 | Neff et al. | 119/3 |
| 4,013,042 | 3/1977 | Ingold | 119/3 |
| 4,084,543 | 4/1978 | Pequegnat | 119/3 |
| 4,164,199 | 8/1979 | Pequegnat | 119/2 |
| 4,170,196 | 10/1979 | Yoneya | 119/3 |
| 4,237,645 | 12/1980 | Kinser | 43/102 |
| 4,610,219 | 9/1986 | Morimura | 119/3 |
| 4,615,301 | 10/1986 | Maekawa et al. | 119/3 |
| 4,762,084 | 8/1988 | Stissing | 119/3 |

FOREIGN PATENT DOCUMENTS

| | | | |
|---|---|---|---|
| 8704319 | 7/1987 | PCT Int'l Appl. | 119/3 |
| 8704320 | 7/1987 | PCT Int'l Appl. | 119/3 |
| 766553 | 10/1980 | U.S.S.R. | 119/3 |
| 1316612 | 6/1987 | U.S.S.R. | 119/3 |

OTHER PUBLICATIONS

"Fishery Civil Engineering", by M. Nakamura, published by Kogyojijitsushinsha on Dec. 1, 1979, p. 459.

Primary Examiner—Cary E. Stone
Attorney, Agent, or Firm—Fleit, Jacobson, Cohn, Price, Holman & Stern

[57] ABSTRACT

An offshore fish cage for farming fish comprises a polygonal frame composed of a multiplicity of frame elements. An upper net is hung down from the polygonal frame and is slackened enough so that it has a length of slack sufficient to cover up and down movement of the polygonal frame caused by waves. A lower net composed of a side net fixed to the upper net and a bottom portion fixed to a bottom end of the side net is provided. The lower net has an opening at its top end. Underwater floats are fitted to the side net, and mooring wires are provided to moor the bottom end of the lower net to the bottom of the sea. The polygonal frame is composed of a multiplicity of frame elements which are joined by flexible joints.

10 Claims, 5 Drawing Sheets

FIG. 3(a)
FIG. 3(b)
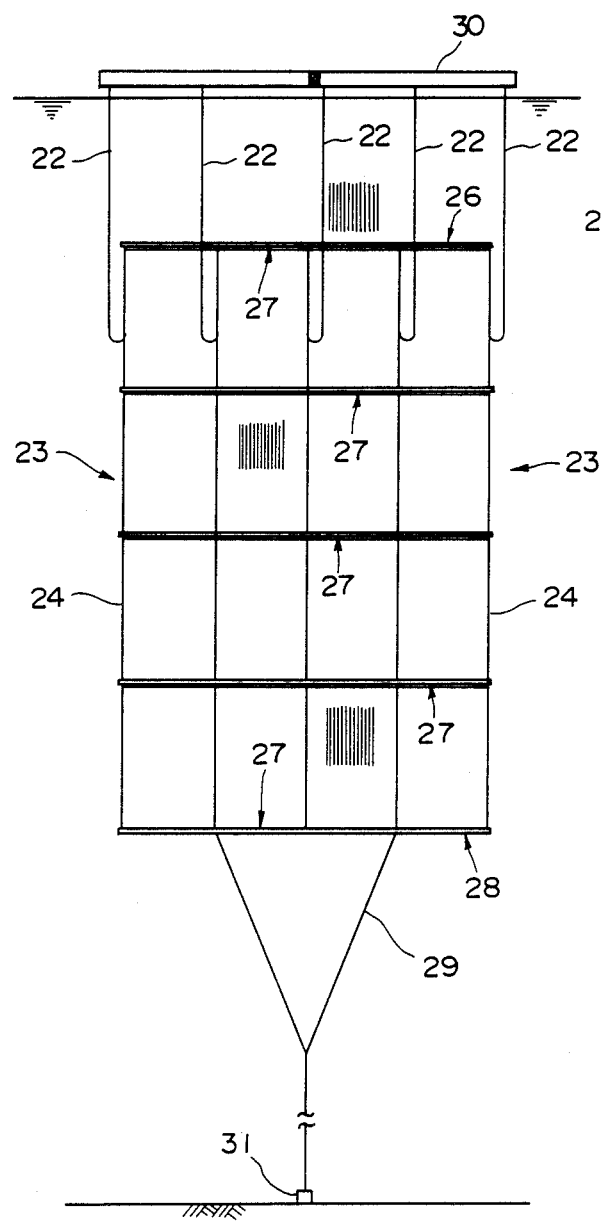
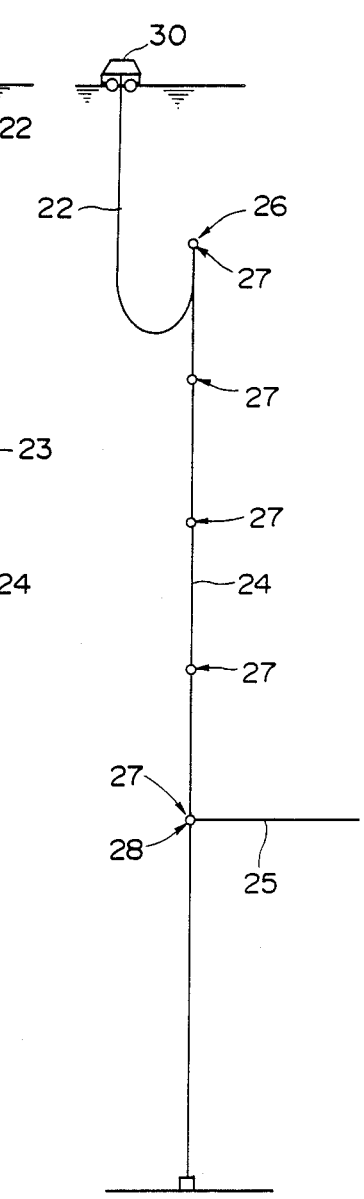

OFFSHORE FISH CAGE FOR FARMING FISH

BACKGROUND OF THE INVENTION

1. Field of the Invention

The present invention relates to an offshore fish cage for farming fish, and more particularly to a structure for a net which forms such an offshore fish cage for farming fish.

2. Description of the Prior Art

One example of a fish cage set in the sea for farming fish is disclosed in "Fishery Civil Engineering", published by KOGYOJIJITSUSHINSHA on Dec. 1, 1979. FIG. 1 is a schematic view of prior art fish cages for farming fish. In FIG. 1, (a) shows schematically a square fish cage for farming fish, (b) a cylindrically shaped fish cage for farming fish, and (c) fish cages for farming fish which are moored. As clearly seen from FIG. 1, in conventional systems cages for farming fish are shaped in such a manner that net 13 is hung down from frame 12 floating on the surface of the water. Net 13 is supported by means of floats 11. The bottom of net 13 is pulled downward by the aid of sinkers 14 or an underwater frame 15. In these vessels, young fish are released and farmed. These fish farming vessels are connected to mooring floats 16. The mooring floats are in turn moored by means of mooring wires 17 to anchors 18 which have been sunk to the bottom of the sea.

Marine fish farming has hitherto been carried out by using square or cylindrically shaped fish cages for fish farming set in bays, where waves and tidal currents hardly affect the fish cages. Generally speaking, in such bay areas the sea is so calm, shallow and tideless that fish excretions, etc., easily accumulate. For this reason, because of the recent increase in the number of such fish farming cages, being used red tide has often occurred and many fish have become sick. This results in a reduced yield and a degraded quality of farmed fish. Furthermore, since in bay areas water temperature and salinity is much more changeable than in the ocean, growth of fish is impaired. In order to overcome these difficulties completely, fish farming in the ocean is preferable, where movement of seawater is strong, the depth is far greater, and water temperature and salinity is less changeable. However, the ocean waves and tidal currents are too strong and severe for conventionally structured fish farming cages to withstand.

Several attempts have been made to provide an acceptable offshore fish cage for farming fish. Two such types of fish cages are discussed below.

(A) Floating and Sinking Type

This type of a fish cage for farming fish can be sunk down to a depth at which it is not affected by sea waves when the sea is rough. There are a few examples of this type of fish cage to be found, but this type is typically so complicated that it is hard to make in larger sizes.

(B) Rubber Framing Type

In this type of a fish cage for farming fish, the frame, floating on the surface of the water, is made of rubber pipe. This frame is designed to be flexible enough to stand sea waves. In this type of cage however, it is to durably fit articles of the frame and net and mooring articles so that they are secured against sea waves. Cost is also high. For these reasons, the fish cage of this type has not yet been commercialized.

SUMMARY OF THE INVENTION

The object of the present invention is to provide a fish cage suitable for farming fish in the ocean.

To attain the object, in accordance with this present invention, an offshore fish cage for farming fish, to be set in the ocean, is provided. This fish cage comprises a polygonal frame floating on the surface of the water and composed of multiplicity of frame elements.

An upper net is hung down from the frame and is slackened in an amount sufficient to cover the length of up and down movement of the frame caused by waves.

A lower net of vessel-like shape, composed of a side net fixed to the upper net and of a bottom portion fixed to the bottom end of the side net, is provided. The lower net has an opening at the top end of the side net.

Underwater floats are fitted to the side net.

Mooring wires, mooring the bottom end of the lower net to the bottom of the sea are also provided.

This object and others and advantages of the present invention, will become more apparent from the detailed description to follow, when considered in conjunction with the appended drawings.

BRIEF DESCRIPTION OF THE DRAWINGS

FIG. 1 is a schematic view of prior art fish cages set in the sea for farming fish, in which

FIG. 3a shows, in enlarged side elevation, a part of the fish cage shown in FIG. 2;

FIG. 3b is a sectional view of the part of the fish cage shown in FIG. 3a;

FIG. 4b is a side elevational view of the truss structure shown in FIG. 4a;

FIG. 5b is a side elevational view of the pipe structure shown in FIG. 5a;

FIG. 6b is an end view of the joint shown in FIG. 6a.

DESCRIPTION OF THE PREFERRED EMBODIMENT

Now, with specific reference to the drawings, an embodiment of the present invention will be described.

Figure 2:
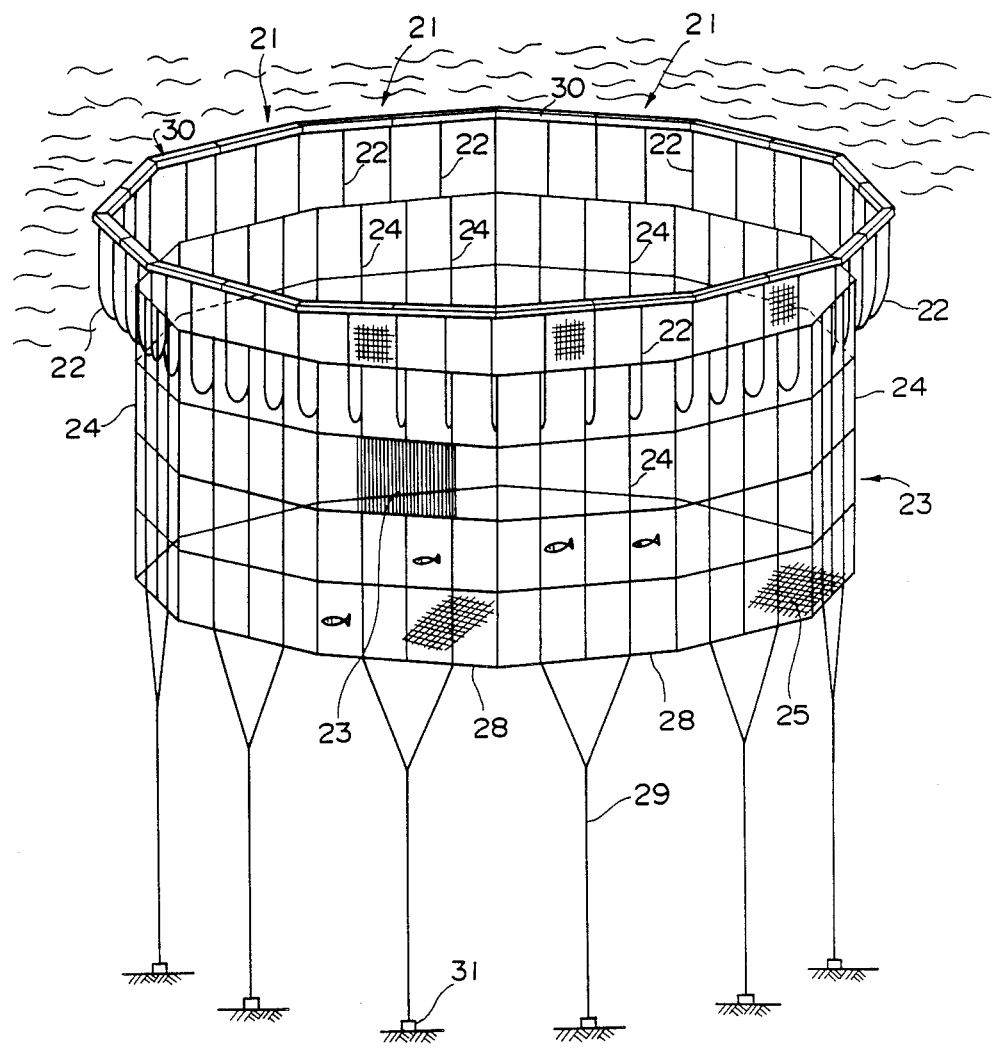
FIG. 2 is a schematic view showing, in perspective the entire structure of an embodiment of a fish cage for farming fish according to the present invention.
Figure 4A:
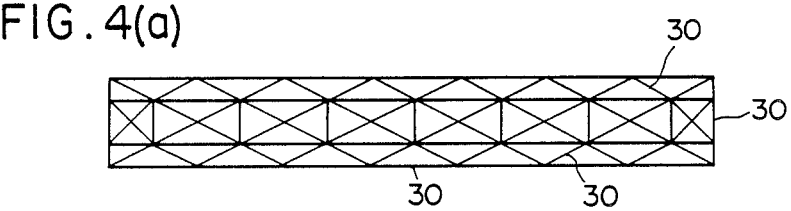
FIG. 4a shows, in plan, a truss structure of frame elements constituting a frame of the present invention which floats on the surface of the water.
Figure 4B:
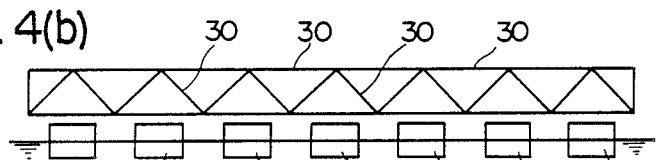
Figure 4D:
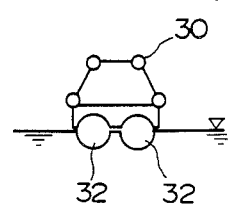
FIG. 4d is a sectional view of the truss structure shown in FIGS. 4a, b and c.
Figure 4C:
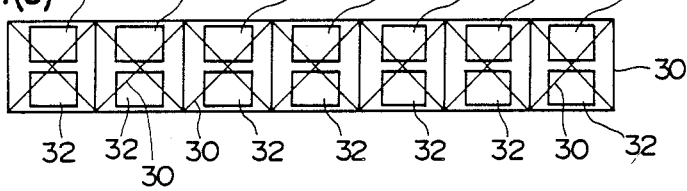
FIG. 4c is a bottom plan view of the truss structure shown in FIGS. 4a and 4b.

FIG. 2 schematically shows a perspective view of the whole structure of an embodiment of an offshore fish cage for farming fish according to the present invention. FIG. 3 shows, in detail, a view of part of the offshore fish cage for farming fish illustrated in FIG. 2.

FIG. 3(a) is a side elevation view of a portion of the cage shown in FIG. 2, while FIG. 3(b) is a sectional view thereof. Netting of the fish cage is composed of upper net 22 and lower net 23. Lower net 23 is further composed of side net 24 and bottom net 25. Upper net 22 is hung down from a frame 21, floating on the surface of the water. Upper net 22 is slackened sufficiently in its lower portion, and top 26 of side net 24 is fixed to the lower end of upper net 22. Top 26 of side net 24 is arranged at a depth level such that impacts from waves do not affect the side net. Underwater floats, i.e., "underfloats" 27 are fitted to side net 24 at multiple points including the top 26 and a bottom end 28 of side net 24, which bottom end is oriented, relative to top 26, in a direction toward the bottom of the sea. Underfloats 27 give a pull-up force to the lower net 23 and maintain the shape of lower net 23. To the bottom end 28 of side net 24 mooring wires 29 are fixed. Mooring wires 29 link the bottom end 28 of the side net to anchors 31, which are sunk into or rest on the bottom of the sea. Consequently, side net 24 is pulled upwards by means of the underwater floats 27, while bottom end 28 is pulled downwards by means of mooring wires 29. Lower net 23 is thereby set under the surface of the sea in a vessel-like shape. Furthermore, adjacent the upper level portion of side net 24, upper net 22 is fixed to frame 21 floating on the surface of the sea such that the upper net is slackened. As a result, when flame 21 moves up and down, due to the impact of waves generated on the surface of the sea, and upper net 22 is shaken up and down as frame 21, moves the shaking of upper net 22 is not transmitted to lower net 23. Frame 21 is also not submerged in the water by the shaking of net 22. Thus frame 21 is able to absorb wave impacts well, and the frame never sinks into the water. This prevents fish from escaping from the fish cage. Because frame 21 does not sink into the water there is no need to set an upper cover over the fish cage to keep the fish from escaping, even when the sea is rough.

Figure 1A:
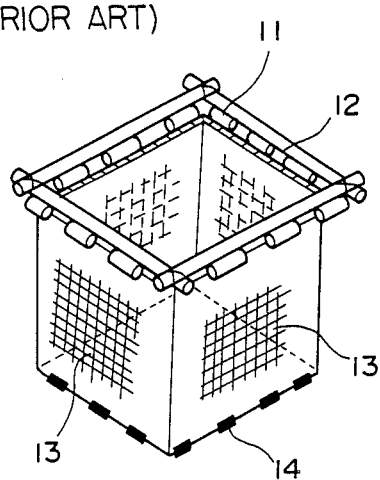
FIG. 1(a) shows, in perspective square shaped fish cages for farming fish.
Figure 1B:
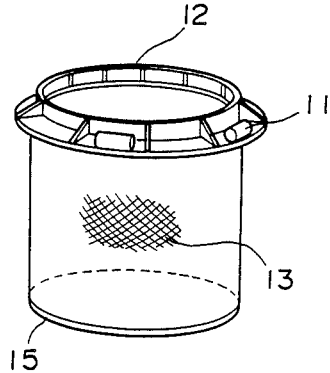
FIG. 1(b) shows a cylindrically shaped fish cage for farming fish.
Figure 1C:
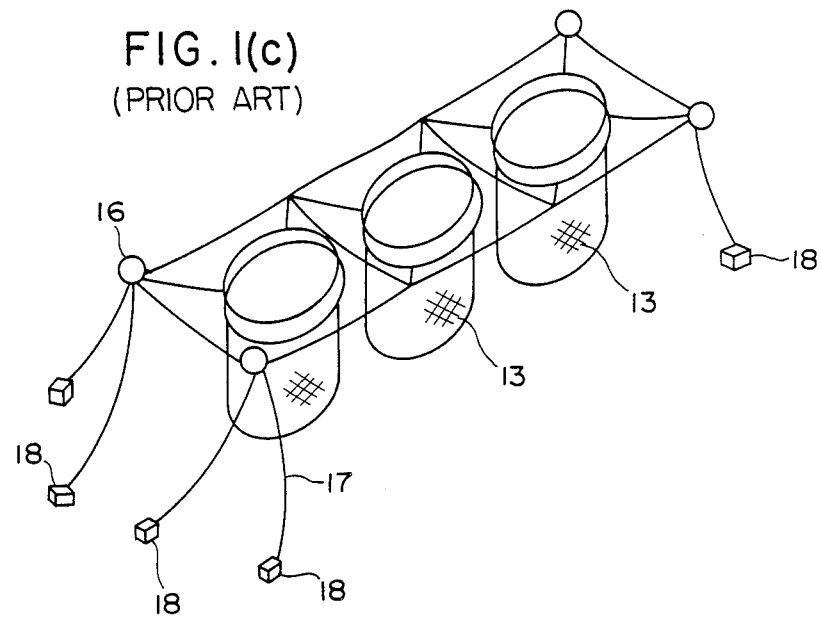
FIG. 1(c) shows moored fish cage for farming fish.

It is preferable to set each of the mooring wires 29 approximately at a right angle relative to the bottom of the sea to thereby moor bottom end 28 of side net 24 to the bottom of the sea. This mooring method is applicable, at low cost, even to deep sea areas since this mooring method requires only a short mooring wire length. Furthermore, in the conventional mooring system shown in FIG. 1(c), free movement of the frame floating on the surface of the water is restricted, and the frame sinks to a great extent in the water. By contrast, in the mooring system of the present invention, movement of frame 21 is not restricted, and frame 21 sinks only a little in the water.

Figure 5A:
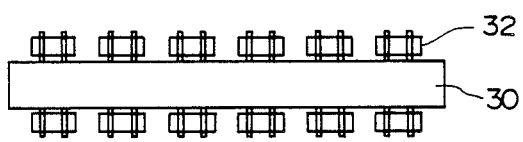
FIG. 5a shows, in plan a pipe structure of frame elements constituting a frame of the present invention which floats on the surface of the water.
Figure 5B:
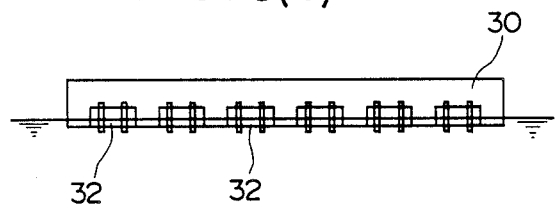
Figure 5C:
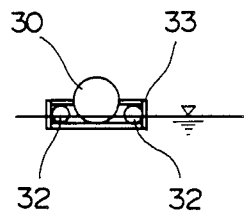
FIG. 5c is a sectional view of the pipe structure shown in FIGS. 5a and 5b.
Figure 6B:
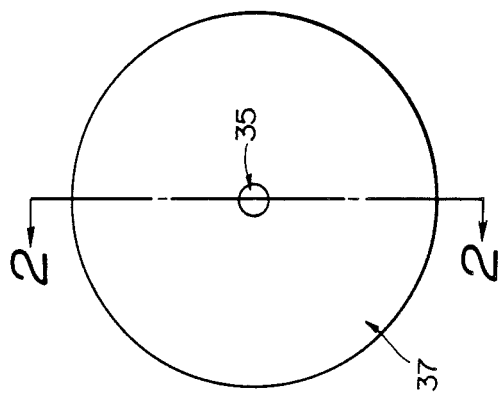
Figure 6A:
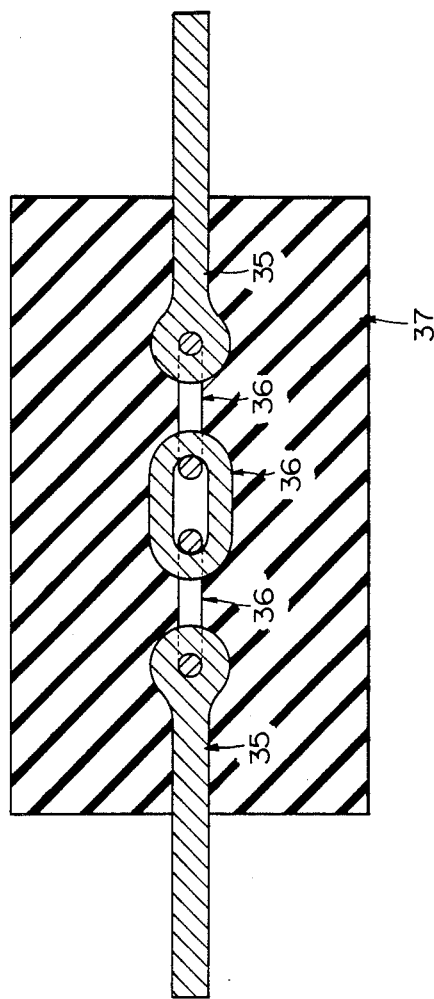
FIG. 6a is a detailed sectional view taken along line 2—2 of FIG. 6b, showing an embodiment of a joint used in the present invention.

FIGS. 4 and 5 are detailed views of frame elements 30 which together constitute frame 21 floating on the surface of the sea. FIG. 4 shows truss structure of frame elements 30 in which, (a) is a plan view, (b) is a side elevational view, (c) is a bottom plan view and (d) is a sectional view of the pipe truss structure. In FIG. 4, reference numeral 32 denotes floats made from polystyrene. Floats 32 are arranged in multiple rows and are fitted to frame elements 30 in the form of a truss structure with a predetermined length. FIG. 5 shows a pipe structure of frame elements 30, in which (a) is a plan view, (b) is a side elevational view, and (c) is a sectional view of the pipe structure. In FIG. 5, floats 32 are fitted to both sides of steel pipe frame elements 30 through the aid of article 33, in which the floats 32 fit. In both the truss structure and the pipe structure, floats 32 are fitted to frame elements 30 at predetermined distances, and force the frame elements to float on the surface of the water. These frame elements 30 are joined flexibly by means of joints made from a combination of rubber and chain to form frame 21. Frame 21 is a large polygonal frame floating on the surface of the water. Frame elements 30 provide some rigidity to frame 21. This rigidity keeps the whole shape of the frame substantially polygonal. The polygonal frame 21 floating on the thus surface of the water is composed of multiple individual frame elements, and those individual frame elements are flexibly jointed. Because of this flexible structure, the fish cage for farming fish of the present invention will not be broken, even if the fish cage is set in the ocean and happens to encounter big or high waves. FIG. 6 shows a joint used to join frame elements 30 of the present invention together. FIG. 6(a) is a sectional view, taken along line 2—2 of FIG. 6(b). The illustrated joint is formed by rods 35 joined by means of chain links 36, which are coated with rubber 37.

In the embodiment, illustrated in FIG. 3(b) the bottom portion of lower net 23 is composed of bottom net 25. However, a plank or sheet or similar structure such as a concrete board, which does not come up to the surface of the sea can be utilized as the bottom portion. When concrete is used as the bottom portion, it is preferable to use a light weight concrete board and to make the board empty or hollow. It is also preferable to have the concrete board sloped so as to prevent leftover feed from accumulating. If the bottom portion is a structure such as a concrete board, fish such as lobsters and flatfish, which typically live at the bottom of the sea can be farmed.

EXAMPLE

In accordance with the structure of the invention illustrated specifically in FIGS. 2 through 5, a fish cage for farming fish is set in a sea area 100 m in depth. The fish cage has a frame 21 of polygonal shape and 110 m in diameter and a lower net 23 100 m in diameter and 50 m deep. The frame is dodecagonal, each side thereof being 28.5 m long. Each side is composed of two frame elements 30 set in series, each of which is 14 m long. The frame elements are mainly of steel pipes and form a truss structure. Buoyacy is generated by fourteen floats made from foamed polystyrene, and forces the truss structure of the frame elements to float on the surface of the sea. Net 24 forms a dodecagonal vessel, each side of which is 25.9 m long, and 40 m deep. The top of side net 24 is positioned at a depth of 10 m from the surface of the water. Underwater floats 27 of pipe shape are fitted to side net 24 at every 10 m in the longitudinal direction, toward the bottom of the sea, so as to keep the side net dodecagonal and give the buoyancy to the same. At the top end of side net 24, supplemental floats can be additionally set when the buoyancy provided these underwater floats is insufficient. The frame floating on the surface of the water and the top end of the side net are joined by the upper net which is hung down from the frame and loosened with sufficient slack. In this example, presuming the wave height to be 15 to 18 m at the maximum, the slackened length should be determined to be 10 m. Consequently, within a 20 m range, the upper net can follow the up and down movement made by the frame due to wave impact. The whole fish cage for farming fish is moored by means of a dozen of mooring wires fitted to the bottom of the side net and connected to the anchors which have been sunk to the bottom of the sea.

What is claimed is:

1. An offshore fish cage for farming fish comprising:
   a polygonal frame floating on a water surface composed of a multiplicity of frame elements;
   an upper net hung down from the frame and having a length of slack equal to or more than the distance said frame is caused to move up and down by waves;
   a lower net having a top end and a bottom end, the lower net composed of a side net fixed to the upper net and a bottom portion joined to the bottom end of the side net, an opening being provided at the top end of the lower net;
   underwater floats fitted to the side net; and
   mooring wires mooring the bottom end of the lower net to the bottom of the sea.

2. The offshore fish cage according to claim 1, wherein the frame is a polygonal frame composed of a multiplicity of frame elements joined by joints.

3. The offshore fish cage according to claim 2, wherein at least one of the joints is formed by rods joined by means of chain links and is coated with rubber.

4. The offshore fish cage according to claim 1, wherein the frame elements are composed of floats and pipe trusses mounted fixedly on upper parts of the floats.

5. The offshore fish cage according to claim 1, wherein the frame elements are composed of pipes and floats fixed to the pipes.

6. The offshore fish cage according to claim 1, wherein a multiplicity of said underwater floats are fitted to the side net in a direction toward the bottom of the sea.

7. The offshore fish cage according to claim 1, wherein the bottom portion is a net.

8. The offshore fish cage according to claim 1, wherein the bottom portion includes concrete.

9. The offshore fish cage according to claim 1, wherein the mooring wires are set down at a right angle to the bottom of the sea.

10. An offshore fish cage for farming fish comprising:
    a polygonal frame composed of frame elements with floats fixed thereto, the frame elements being joined together by joints;
    an upper net hung down from the frame and having a length of slack equal to or more than the distance said frame is caused to move up and down by waves;
    a lower net having a top end and a bottom end, the lower net composed of a side net fixed to the upper net and a concrete board fixed to the bottom end of the side net, an opening being provided at the top end of the lower net;
    a multiplicity of underwater floats fitted to the side net in a direction toward the bottom of the sea; and
    mooring wires being set approximately at a right angles to the bottom of the sea to moor a bottom end of the side net to the bottom of the sea.

* * * * *